United States Patent
Zhang et al.

(10) Patent No.: US 11,427,172 B2
(45) Date of Patent: Aug. 30, 2022

(54) LATERAL DYNAMIC CONTROL FOR REGENERATIVE AND FRICTION BRAKE BLENDING

(71) Applicant: Robert Bosch GmbH, Stuttgart (DE)

(72) Inventors: Zhe Zhang, Commerce Township, MI (US); Lance Bredthauer, Livonia, MI (US)

(73) Assignee: Robert Bosch GmbH, Stuttgart (DE)

( * ) Notice: Subject to any disclaimer, the term of this patent is extended or adjusted under 35 U.S.C. 154(b) by 709 days.

(21) Appl. No.: 16/339,021

(22) PCT Filed: Oct. 5, 2017

(86) PCT No.: PCT/EP2017/075380
§ 371 (c)(1),
(2) Date: Apr. 3, 2019

(87) PCT Pub. No.: WO2018/073017
PCT Pub. Date: Apr. 26, 2018

(65) Prior Publication Data
US 2019/0225199 A1 Jul. 25, 2019

Related U.S. Application Data

(60) Provisional application No. 62/410,036, filed on Oct. 19, 2016.

(51) Int. Cl.
*B60T 8/1755* (2006.01)
*B60W 30/045* (2012.01)
(Continued)

(52) U.S. Cl.
CPC ............ *B60T 8/17552* (2013.01); *B60L 7/26* (2013.01); *B60T 8/17551* (2013.01);
(Continued)

(58) Field of Classification Search
CPC ... B60W 30/02; B60W 30/045; B60T 8/1755; B60T 8/17551; B60T 8/17552;
(Continued)

(56) References Cited

U.S. PATENT DOCUMENTS 5,188,434 A * 2/1993 Ruf .................. B60T 8/1755
303/146
5,228,757 A * 7/1993 Ito .................... B60T 8/1755
303/146
(Continued)

FOREIGN PATENT DOCUMENTS

EP 2172378 4/2010
EP 2172378 A1 4/2010
(Continued)

OTHER PUBLICATIONS

Vbox Automotive, "Oversteer-Understeer: Objective measurement of tyre oversteer using VBOX equipment", Jun. 16, 2015, 7 pages, downloaded from: https://www.vboxautomotive.co.uk/downloads/Oversteer-Understeer%20Analysis%20in%20Tyre%20Testing.pdf (Year: 2015).*

(Continued)

*Primary Examiner* — David A Testardi
(74) *Attorney, Agent, or Firm* — Michael Best & Friedrich LLP (57) ABSTRACT

Methods and systems are described for controlling a vehicle braking system. A braking force is applied to the vehicle by applying friction only braking to the wheels of one axle and applying a blended braking force (including a regenerative braking force and a friction braking force) to the wheels of another axle. Using vehicle and tire modeling techniques, a set of side-slip angles is calculated that is estimated to occur if the total braking force were applied using only friction braking. A compensatory yaw moment is then determined based on differences between the estimated side-slip angles (Continued)

and the actual side-slip angles of the vehicle under the blended braking. The compensatory yaw moment is then applied to the vehicle to enable the vehicle to utilize regenerative braking while exhibiting the same vehicle dynamics that occur when using friction braking only.

15 Claims, 5 Drawing Sheets (51) Int. Cl.
B60L 7/26 (2006.01)
B60T 13/58 (2006.01)
(52) U.S. Cl.
CPC ......... B60T 13/586 (2013.01); B60W 30/045 (2013.01); B60T 2201/16 (2013.01); B60T 2230/02 (2013.01); B60T 2250/03 (2013.01); B60T 2270/30 (2013.01); B60T 2270/604 (2013.01); B60T 2270/613 (2013.01)
(58) Field of Classification Search
CPC ............... B60T 13/586; B60T 2201/16; B60T 2230/02; B60T 2270/60; B60T 2270/604; B60T 2270/613; B60L 7/26
See application file for complete search history.

(56) References Cited

U.S. PATENT DOCUMENTS

| | | | | |
|---|---|---|---|---|
| 5,735,584 A * | 4/1998 | Eckert | ................ | B60W 10/184 303/140 |
| 6,035,251 A * | 3/2000 | Hac | ................ | B60T 8/1755 303/140 |
| 6,195,606 B1 * | 2/2001 | Barta | ................ | B60T 8/17552 303/140 |
| 6,466,857 B1 * | 10/2002 | Belvo | ................ | B60T 8/175 180/197 |
| 6,547,343 B1 * | 4/2003 | Hac | ................ | B60T 8/1755 303/140 |
| 6,549,842 B1 * | 4/2003 | Hac | ................ | B60T 8/172 303/149 |
| 6,691,013 B1 * | 2/2004 | Brown | ................ | B60W 20/13 701/70 |
| 2002/0147532 A1 * | 10/2002 | Inagaki | ................ | B60G 17/0195 701/41 |
| 2003/0230933 A1 * | 12/2003 | Schneider | ................ | B60T 1/10 303/146 |
| 2004/0046448 A1 * | 3/2004 | Brown | ................ | B60T 8/1755 303/152 |
| 2004/0225427 A1 * | 11/2004 | Anwar | ................ | B60T 8/17555 280/5.5 |
| 2005/0159871 A1 * | 7/2005 | Nakamura | ................ | B60T 8/1755 701/70 |
| 2005/0206235 A1 * | 9/2005 | Tseng | ................ | B60T 8/1837 303/146 |
| 2008/0100129 A1 * | 5/2008 | Lubbers | ................ | B60L 7/18 303/113.1 |
| 2009/0055040 A1 * | 2/2009 | Nagaya | ................ | B60C 23/0408 701/31.4 |
| 2009/0248269 A1 * | 10/2009 | Yasui | ................ | B60T 8/17552 701/74 |
| 2011/0307129 A1 * | 12/2011 | Yu | ................ | B60L 3/102 701/22 |
| 2012/0055744 A1 * | 3/2012 | Chen | ................ | B60T 8/267 188/106 P |
| 2013/0144476 A1 * | 6/2013 | Pinto | ................ | B60T 8/17555 903/930 |
| 2013/0211644 A1 * | 8/2013 | Yokoyama | ................ | B60W 20/14 701/22 |
| 2013/0231799 A1 * | 9/2013 | Kimura | ................ | B60W 30/045 701/1 |
| 2015/0120106 A1 * | 4/2015 | Yu | ................ | B60K 6/52 701/22 |
| 2016/0368384 A1 * | 12/2016 | Johansson | ................ | B60L 3/102 |
| 2017/0021731 A1 * | 1/2017 | Suzuki | ................ | B60T 8/1755 |
| 2017/0232848 A1 * | 8/2017 | Lian | ................ | B60L 58/10 701/22 |
| 2018/0229718 A1 * | 8/2018 | Kambe | ................ | B60W 40/114 |
| 2018/0237001 A1 * | 8/2018 | Lian | ................ | B60L 3/0076 |
| 2018/0297585 A1 * | 10/2018 | Lian | ................ | B60W 10/08 |
| 2020/0039504 A1 * | 2/2020 | Chatzikomis | ................ | B60T 8/17552 |
| 2020/0140009 A1 * | 5/2020 | Sasaki | ................ | B60W 10/06 |
| 2021/0245757 A1 * | 8/2021 | Imamura | ................ | B60W 30/18172 |
| 2021/0370951 A1 * | 12/2021 | Kim | ................ | B60W 40/109 |

FOREIGN PATENT DOCUMENTS

| | | | | |
|---|---|---|---|---|
| JP | 06341822 A | * | 12/1994 | |
| JP | 08183433 A | * | 7/1996 | |
| JP | 08183434 A | * | 7/1996 | ............... B60T 8/00 |
| JP | 2013071549 | | 4/2013 | |
| JP | 2013071549 A | * | 4/2013 | |
| JP | 2013071549 A | | 4/2013 | |
| JP | 2015085794 A | * | 5/2015 | |
| WO | WO-2005110827 A1 | * | 11/2005 | ............... B60T 8/00 |

OTHER PUBLICATIONS

Wikipedia article, "Slip angle", Old revision dated Mar. 17, 2016, 3 pages (Year: 2016).*
International Search Report for PCT application No. PCT/EP2017/075380, (dated Jan. 23, 2018).
International Search Report and Written Opinion for Application No. PCT/EP2017/075380 dated Jan. 23, 2018 (11 pages).

* cited by examiner

LATERAL DYNAMIC CONTROL FOR REGENERATIVE AND FRICTION BRAKE BLENDING

RELATED APPLICATIONS

This application claims the benefit of U.S. Provisional Application No. 62/410,036, filed Oct. 19, 2016, entitled "FRICTION BRAKE STRATEGY FOR LATERAL DYNAMICS DURING REGENERATIVE BRAKE BLENDING AT ONE DRIVE AXLE," the entire contents of which are incorporated herein by reference.

BACKGROUND

The present invention relates to systems and methods for controlling braking systems in a vehicle. In particular, the invention related to systems and methods for providing regenerative braking for a vehicle while the vehicle is travelling through a turn (i.e., "cornering").

SUMMARY

In one embodiment, the invention provides a method of controlling a vehicle braking system. A braking force is applied to the vehicle by applying a regenerative braking force to the wheels of the first axle of the vehicle and applying a friction braking force to the wheels of the second axle of the vehicle. An electronic processor determines a set of actual side-slip angles for the vehicle including a first axle side-slip angle for the wheels of the first axle and a second axle side-slip angle for the wheels of the second axle. The electronic processor also uses vehicle modeling techniques to determine a set of estimated side-slip angles for the vehicle. The set of estimated side-slip angles includes an estimated first axle side-slip angle for the wheels of the first axle and an estimated second axle side-slip angle for the wheels of the second axle. The second of estimated side-slip angles is indicative of side-slip angles for the vehicle that are estimated to occur under the same driving conditions if the braking force where applied to the vehicle using only friction braking (and not using any regenerative braking force). A compensatory yaw moment for the vehicle is then determined based on the difference between the set of actual side-slip angles and the set of estimated side-slip angles. The compensatory yaw moment is then applied to the vehicle to cause the set of actual side-slip angles to approach the set of estimated side-slip angles. In some embodiments, the compensatory yaw moment is applied to the vehicle by applying an asymmetric friction braking force.

In another embodiment, the invention provides a vehicle braking system that includes an electronic controller. In some implementations, the electronic controller includes an electronic processor and a non-transitory computer-readable memory storing instructions that are executed by the electronic processor to provide the functionality of the electronic controller. The electronic controller is configured to apply a braking force to the vehicle by applying a regenerative braking force to wheels of the first axle and applying a friction braking force to wheels of the second axle of the vehicle. The electronic controller then determines a set of actual side-slip angles for the vehicle and a set of estimated side-slip angles for the vehicle. The set of estimated side-slip angles is determined based on vehicle and tire modelling techniques and is indicative of side-slip angles for the vehicle that are estimated to occur under the same driving conditions if the braking force were applied to the vehicle using only friction braking. The electronic controller then determines a compensatory yaw moment for the vehicle based on a difference between the set of actual side-slip angles and the set of estimated side-slip angles and applies the compensatory yaw moment to the vehicle to cause the set of actual side-slip angles to approach the set of estimated side-slip angles.

In some aspects, a vehicle braking system is configured in such a way as to allow a vehicle with regenerative braking to have the same turning characteristics as a "friction only" braked vehicle.

In some aspects, a control system employs software that is configured to control vehicle braking in such a way as to allow the vehicle with regenerative braking to have the same turning characteristics as the "friction only" braked vehicle.

In some aspects, a control system employs software to perform yaw control with asymmetrical braking during regenerative braking using a model based on feed forward control. This can be compared to some conventional control systems that employ feedback control instead of model based feed forward control.

In some aspects, the system and method include calculating the difference of wheel side slip angle and/or side force between the vehicle having regenerative braking and the vehicle with only friction braking, and then compensating for the difference with asymmetrical braking. In some embodiments, the targeted application has only one electrical motor at either the front or rear axle.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
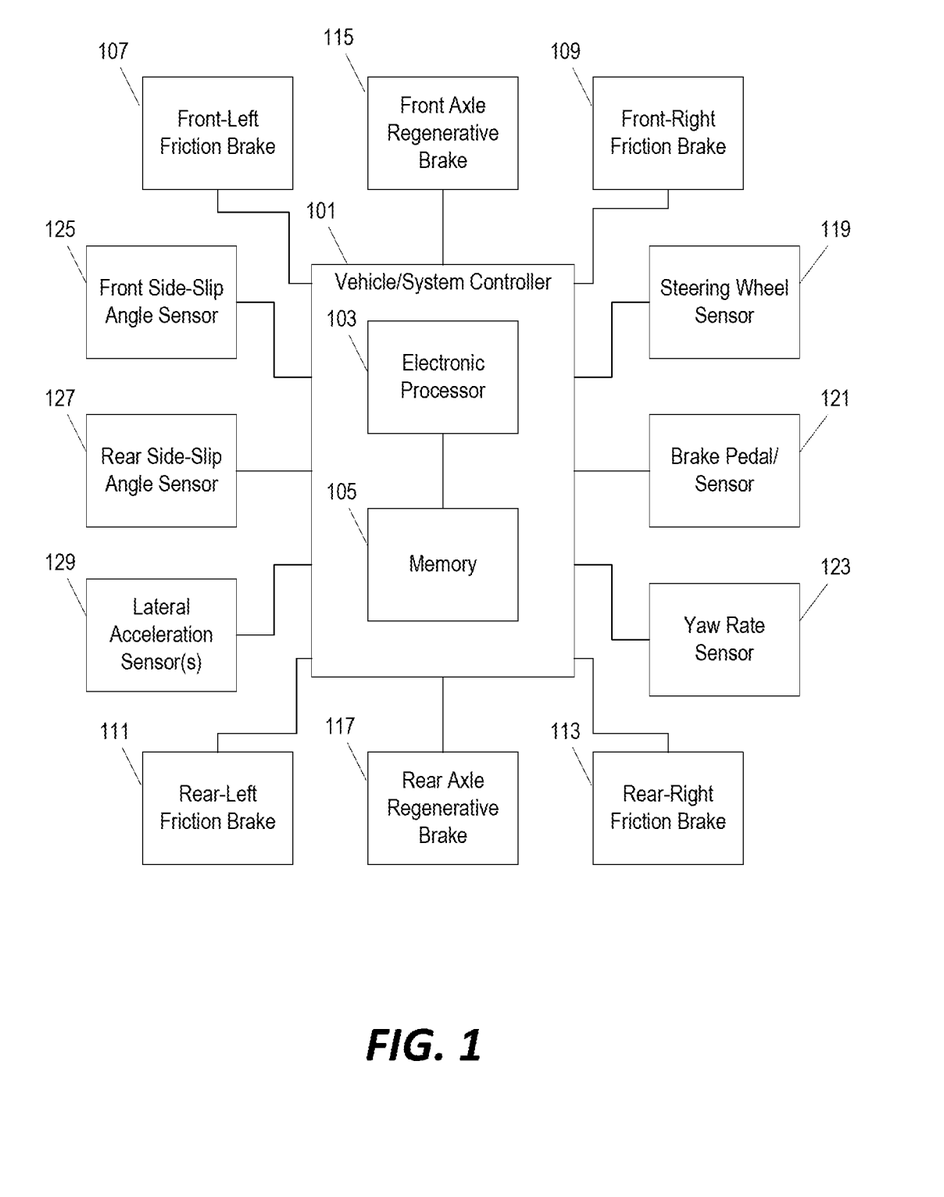
FIG. 1 is a block diagram of a vehicle control system including a friction braking system and a regenerative braking system according to one embodiment.

FIG. 1 illustrates an example of a vehicle system configured to apply braking forces using friction braking, regenerative braking, or a blended combination of friction and regenerative braking. A vehicle/system controller 101 includes an electronic processor 103 and a non-transitory, computer-readable memory 105. The memory 105 stores instructions that are accessed and executed by the electronic processor 103 to cause the controller 101 to provide functionality including, for example, the functions described in the examples below.

The controller 101 is communicatively coupled to a friction braking system including a front-left friction brake 107, a front-right friction brake 109, a rear-left friction brake 111, and a rear-right friction brake 113. In some implementations, the friction braking system includes a hydraulic pressure control system (not pictured) that is configured to adjust a braking force applied to each wheel of the vehicle by a respective one of the friction brakes 107, 109, 111, 113. The hydraulic pressure control system can be provided in various implementations, for example, as part of the controller 101, as part of each individual friction brake, 107, 109, 111, 113, or as a separate component of the vehicle system. Furthermore, in some implementations, the system is configured to apply asymmetric braking such that under certain conditions a separate braking force can be determined for and applied to each individual wheel of the vehicle. Accordingly, under asymmetric braking, the braking force applied to the rear-right wheel by the rear-right friction brake 113 is not necessarily the same as the braking force applied to the rear-left wheel by the rear-left friction brake 111. Similarly, the braking force applied to the front-right wheel by the front-right friction brake 109 is not necessarily the same as the braking force applied to the front-left wheel by the front-left friction brake 107.

The controller 101 is also communicatively coupled to a regenerative braking system that includes a front axle regenerative brake 115 and a rear axle regenerative brake 117. The regenerative braking system is configured to apply a braking force while generating electrical power that is then stored to a battery and/or provided to electrically-powered systems and components of the vehicle. Although the example of FIG. 1 shows both a front axle regenerative brake 115 and a rear axle regenerative brake 117, in some implementations, the system may include only a front axle regenerative brake 115 or only a rear axle regenerative brake 117 and not both.

The controller 101 is also communicatively coupled to a steering wheel sensor 119 to receive a signal indicative of a desired steering and to a brake pedal sensor 121 to receive a signal indicative of a desired braking force. However, in other implementations, the signal indicative of a desired vehicle steering may come from other sources including, for example, another vehicle system (e.g., an automated driving/steering system), a steering control other than a "steering wheel" (e.g., a "joystick" control), or an adjusting steering compensation system that calculates a target vehicle steering based in part on a user control input. Similarly, in other implementations, the signal indicative of a desired braking force may come from other sources including, for example, another vehicle system (e.g., an automated driving or adaptive cruise control system). In still other implementations, a target steering and a target braking force can be calculated by the controller 101 based on inputs from one or more vehicles sensors or user input controls.

The controller 101 is also communicatively coupled to a yaw rate sensor 123, a front side-slip angle sensor 125, and a rear side-slip angle sensor 127. The yaw rate sensor 123 is configured to provide a signal indicative of a yaw rate of the vehicle (e.g., the rate at which the yaw of the vehicle is changing). The side-slip angle sensors 125, 127 are configured to determine an angle at which the vehicle is "slipping" on the front axle and on the rear axle. Although the example of FIG. 1 shows the yaw rate sensor 123 and the side-slip angle sensors 125, 127 as separate "sensor" components, in some implementations, the system is configured to calculate vehicle yaw and one or more of the side-slip angles based on information from one or more other sensors. For example, in some implementations, one or more of the side-slip angles may be calculated by the controller 101 based, at least in part, on a measured yaw rate, a steering angle, and/or a lateral acceleration of the vehicle. The controller 101 is also communicatively coupled to one or more lateral acceleration sensors 129.

Figure 2A:
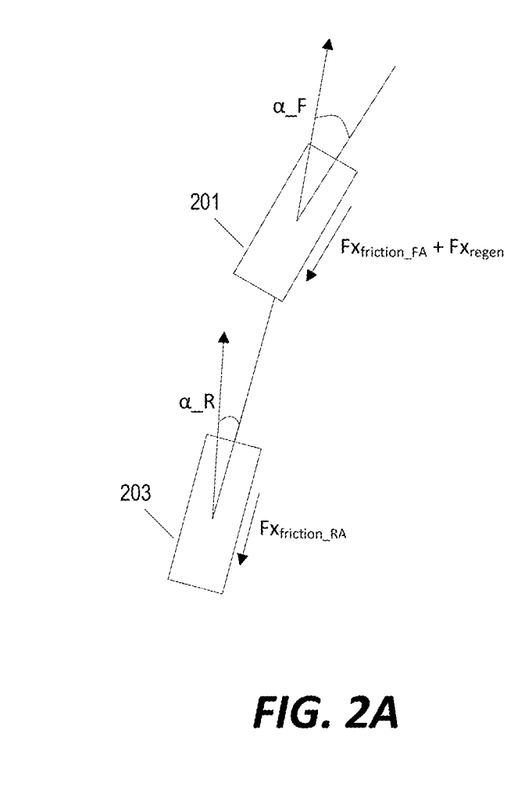
FIG. 2A is an overhead schematic diagram of a vehicle using blended friction braking and regenerative braking while turning using the system of FIG. 1.
Figure 2B:
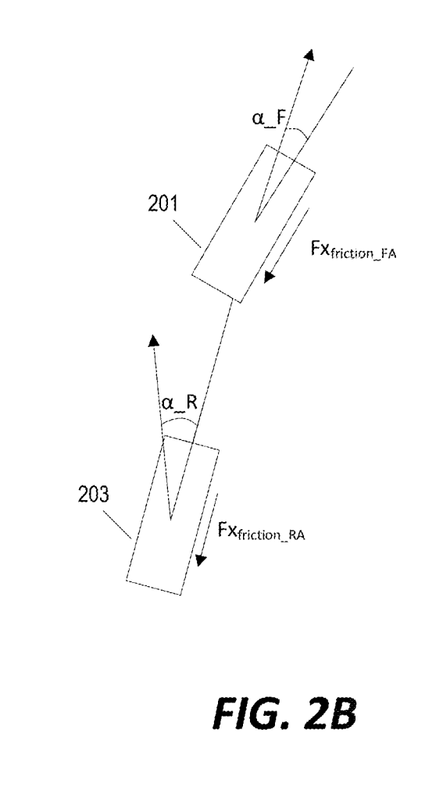
FIG. 2B is an overhead schematic diagram of a vehicle using only friction braking while turning using the system of FIG. 1.
Figure 2C:
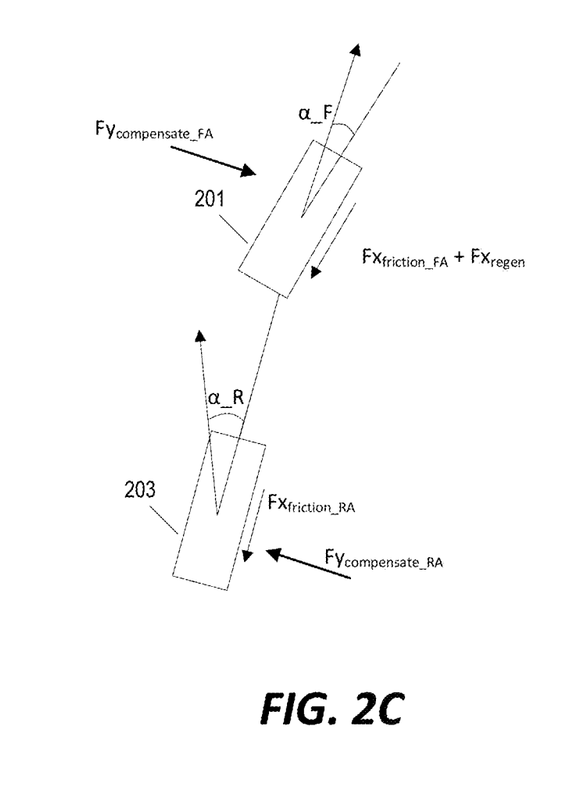
FIG. 2C is an overhead schematic diagram of a vehicle using blended friction braking and regenerative braking with lateral compensation while turning using the system of FIG. 1.

FIGS. 2A, 2B, and 2C illustrates examples of different braking strategies applied to the front and rear axle of the vehicle using the system of FIG. 1. In FIG. 2A, a blended combination of a friction braking force ($Fx_{friction\_FA}$) and a regenerative braking force ($Fx_{regen}$) is applied to the wheels of the front axle 201 while only a friction braking force ($Fx_{friction\_RA}$) is applied to the rear wheels 203. In FIG. 2B, only friction braking forces are applied to both the front wheels ($Fx_{friction\_FA}$) and the rear wheels ($Fx_{friction\_RA}$). The same total braking force is applied to the vehicle in the example of FIG. 2A and in the example of FIG. 2B. However, because of the regenerative braking force ($Fx_{regen}$) on the front axle in the example of FIG. 2A, the front axle will undergo greater braking force compared to the "friction only" braking in the example of FIG. 2B. Accordingly, the front axle will exhibit a greater side-slip angle on the front axle ($\alpha\_F$) with the blended braking of FIG. 2A as compared to the side-slip angle of the front axle ($\alpha\_F$) with the "friction only" braking of FIG. 2B. At the same time, the rear-axle will undergo a smaller braking force in the example of FIG. 2A causing the rear axle to have a smaller side-slip angle ($\alpha\_R$) in the example of FIG. 2A as compared to the side-slip angle of the rear axle ($\alpha\_R$) with the "friction only" braking of FIG. 2B. As a result, the vehicle steering performance tends to exhibit an "understeering" condition when blended friction/regenerative braking is applied to the front wheels while turning. Conversely, although not illustrated in the examples of FIGS. 2A and 2B, the vehicle steering performance tends to exhibit an "oversteering" condition when blended friction/regenerative braking is applied to the rear axle wheels (with friction only braking applied to the front axle wheels).

The example of FIG. 2C illustrates a mechanism for adjusting the side-slip angles of the vehicle by applying additional side forces at the front axle ($Fy_{compensate\_FA}$) and at the rear axle ($Fy_{compensate\_RA}$). Applying these additional side forces to the front and rear axles in opposite directions results in a compensatory yaw moment applied to the vehicle. The compensatory yaw moment can be configured to compensate for the "understeering" condition illustrated in the example of FIG. 2A (and for the "oversteering" condition also discussed above). It can also be configured to regulate the side-slip angles on the front axle ($\alpha\_F$) and the rear axle ($\alpha\_R$) of the vehicle during regenerative braking to match the side-slip angles during the "friction only" braking so that the vehicle exhibits the same turning characteristics in either braking strategy. As illustrated in the example of FIG. 2C, the braking forces applied to the wheels of each axle are the same as in the example of FIG. 2A, but the side-slip angles are the same as in the example of FIG. 2B.

Because the additional side forces cannot be applied to each axle without some external input (i.e., another object or system applying the force to the vehicle), in some implementations, the side forces are realized in the form of a compensatory yaw moment that will have a similar effect on the operation of the vehicle. In some implementations, the compensatory yaw moment is generated by applying asymmetrical friction braking to the vehicle.

Figure 3:
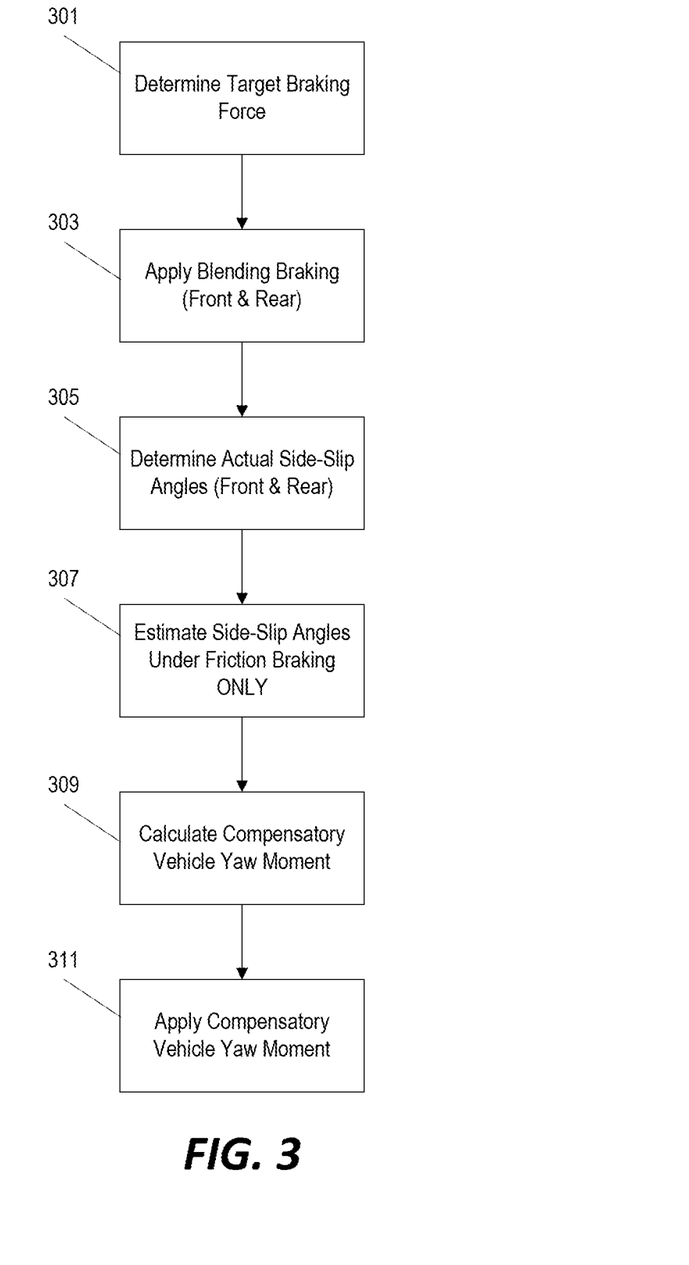
FIG. 3 is a flowchart of a method for control the system of FIG. 1 to provide lateral compensation during blended friction braking and regenerative braking according to one embodiment.

FIG. 3 illustrates a method for calculating and applying the additional side forces to achieve the compensatory yaw moment such as illustrated in the example of FIG. 2C. First, the controller 101 determines a target braking force (step 301) based, for example, on data received from the brake pedal sensor 121. The controller 101 then applies blended braking to the front axle wheels and friction only braking to the rear axle wheels based on the determined target braking force (step 303) and determines the actual side-slip angles on the front and rear axle wheels, respectively (step 305). The controller 101 then determines an estimated side-slip angle for the front and rear axles based on the current steering and total braking force (step 307). The estimated side-slip angles for "friction only" braking can be determined, for example, by applying a vehicle modelling calculations or using a look-up table stored to the memory 105. The controller 101 will then calculate a compensatory yaw moment that will cause the actual side-slip angles under blended braking to match the estimated side-slip angles for "friction only" braking (step 309). In some implementations, the compensatory yaw moment is determined by calculating an actual yaw moment resulting from the applied blended braking, determining an estimated yaw moment based on the estimated side-slip angles for the friction only braking, and determining a compensatory yaw moment based on the difference between the actual yaw moment and the estimated yaw moment.

Finally, the compensatory yaw moment is applied to the vehicle (step 311). In some implementations, the compensatory yaw moment is applied by controlling the torque or braking force on the wheels on the vehicle. In some implementations, the controller 101 is configured to apply the compensatory yaw moment by applying asymmetric friction braking forces on the vehicle. For example, the compensatory yaw moment can be applied by increasing the braking force on the rear-left wheel and increasing the braking force on the front-right wheel of the vehicle. In some implementations, the braking forces of the wheels on the same axle are correspondingly adjusted to ensure that the same total braking force is applied. For example, the controller 101 may be configured to apply a compensatory yaw moment by increasing the braking force applied by the rear-right friction brake 113 and decreasing the braking force applied by the rear-left friction brake 111 while also increasing the braking force applied by the front-left friction brake 107 and decreasing the braking force applied by the front-right friction brake 109.

Figure 4:
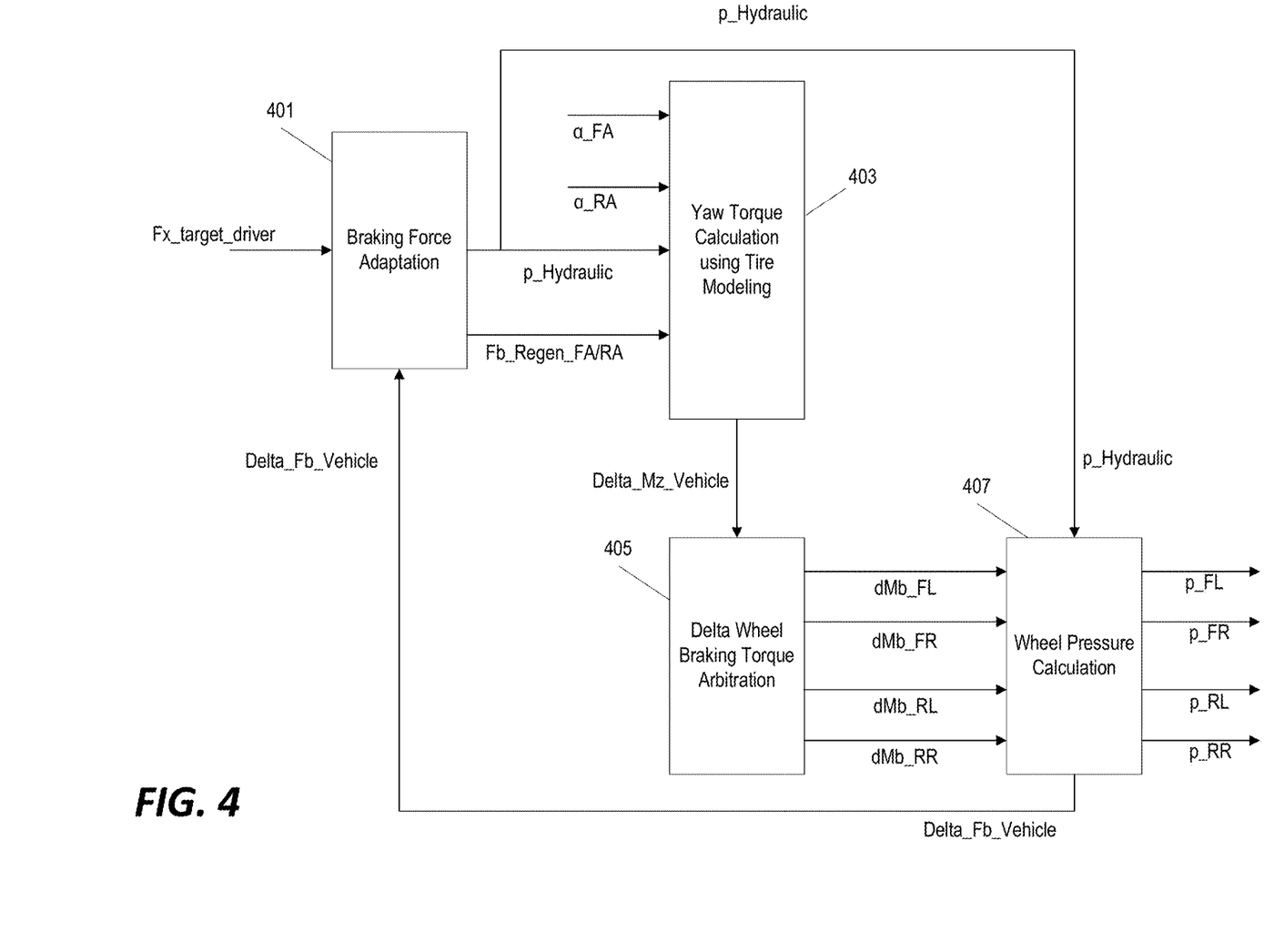
FIG. 4 is a functional block diagram of a method for implementing the lateral compensation control of the method of FIG. 3 using asymmetric friction braking to apply a compensatory vehicle yaw moment according to one embodiment.

FIG. 4 illustrates another example of how the controller 101 might be configured to apply the compensatory yaw moment through asymmetric control of the friction brakes. First, the controller 101 performs a braking force adaptation 401 by calculating a hydraulic pressure for friction braking (p_Hydraulic) and a regenerative braking force for the driven axle (Fb_Regen_FA for front axle regenerative braking or Fb_Regen_RA for rear axle regenerative braking) based on a driver requested total braking force (Fx_target_driver). The controller 101 then performs a yaw torque calculation using tire modeling 403 to determine a compensatory vehicle yaw moment (Delta_Mz_Vehicle) based on the hydraulic pressure for friction braking (p_Hydraulic), the regenerative braking force (Fb_Regen_FA/RA), the side-slip angle of the front axle wheels ($\alpha$_FA), and the side-slip angle of the rear axle wheels ($\alpha$_RA). The controller 101 then performs wheel braking torque arbitration 405 to determine an adjustment of the braking force to be applied to each of the four friction brakes (dMb_FL (front-left), dMb_FR (front-right), dMb_RL (rear-left), and dMb_RR (rear-right)) that will achieve the calculated compensatory yaw moment (Delta_Mz_Vehicle). Finally, actually wheel pressure calculation 407 is performed to calculate an actual hydraulic pressure that will be applied to each of the friction brakes (p_FL (front-left pressure), p_FR (front-right pressure), p_RL (rear-left pressure), and p_RR (rear-right pressure)) based on the total hydraulic pressure demand (p_Hydraulic) and the calculated friction braking adjustments for each wheel. In this example, additional friction braking force is applied to each wheel to apply the compensatory yaw moment. Accordingly, the additional overall braking force introduced by the brake control (Delta_Fb_Vehicle) is used as feedback and is compensated when recalculating the requested overall braking force.

In the examples discussed above, the actual side-slip angles ($\alpha$_F and $\alpha$_R) that occur under blended braking are measured/calculated and compared to estimated side-slip angles that would occur under "friction only" braking. However, in some implementations, the controller 101 may be configured to calculate/determine estimated side-slip angle values for both blended braking and "friction only" braking based on the desired steering input and the desired braking inputs. Furthermore, in some implementations, the controller 101 might be configured to monitor the actual side-slip angles of the vehicle and to gradually adjust the applied compensatory yaw moment until the actual-side-slip angles of the vehicle approach target side-slip angles.

As noted above, in some implementations, the estimated side-slip angles for "friction only" braking are calculated in real-time using modelling algorithms based on vehicle dynamics while, in other implementations, the estimated side-slip angles for "friction only" braking are determined using a "look-up table" stored to the memory 105. The look-up table may be configured to identify a set of side-slip angles corresponding to each combination of vehicle performance variables including, for example, target steering, current yaw rate, total braking force, and lateral acceleration. In some implementations, this look-up table is compiled by experimental data and/or modelling calculations. However, in other implementations, the look-up table is updated and refined during operation of the vehicle based on observed actual side-slip angles under various performance conditions while using "friction only" braking.

Figure 5:
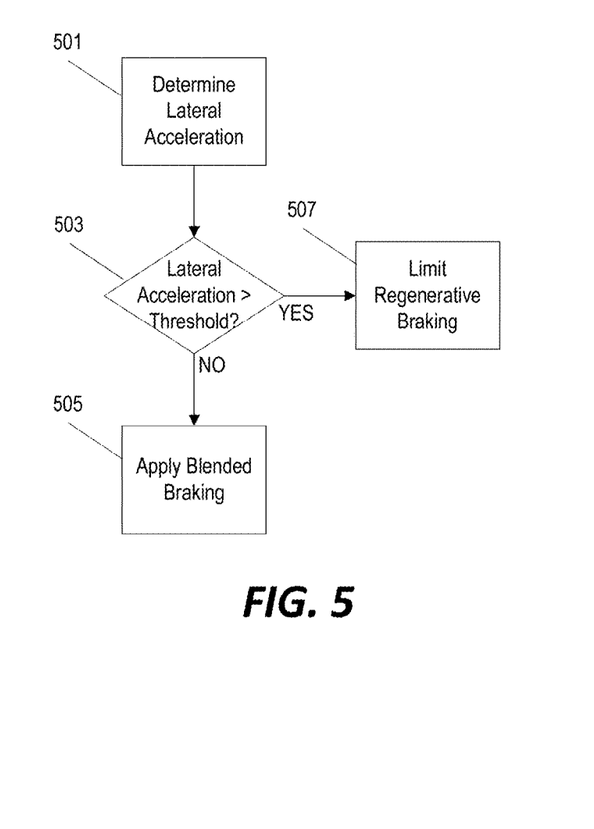
FIG. 5 is a flowchart of a method for limiting regenerative braking during blended braking based on a lateral acceleration of the vehicle according to one embodiment.

In some implementations, additional control mechanisms are implemented to achieve target braking performance and vehicle dynamics. As illustrated in the example of FIG. 5, a controller 101 may be configured to calculate/monitor lateral acceleration of a vehicle (step 501) and to compare the lateral acceleration to a threshold (step 503). If the lateral acceleration is below the threshold, blended braking is applied with full, unrestricted regenerative braking (step 505). However, under conditions where excessively high lateral acceleration is detected (i.e., lateral acceleration above a threshold), the controller 101 may limit the regenerative braking (step 507). For example, the controller 101 may be configured to used "friction only" braking when it detects that lateral acceleration is above a defined threshold. Alternatively, the controller 101 may be configured to adjust the amount of braking force applied by the regenerative braking based, at least in part, on the detected lateral acceleration (e.g., when the lateral acceleration is above the threshold, the braking force applied by regenerative braking is decreased by a percentage in proportion to the amount by which the lateral acceleration exceeds the threshold).

In some implementations, the controller 101 is configured to apply a braking strategy where inside wheels are braked before outside wheels. For example, in the method of FIG. 6, the controller 101 monitors lateral acceleration of the vehicle (step 601) and detects any changes in the turning of the vehicle (step 603) (e.g., based on a change in the steering wheel angle or a change in the vehicle yaw or yaw rate). In response to detecting a change in the turning of the vehicle (step 603), the controller 101 determines a target braking adjustment (step 605) and first applies the target braking adjustment to the inside wheels (step 607). Later, the braking adjustment is also applied to the outside wheels (step 609).

Figure 6:
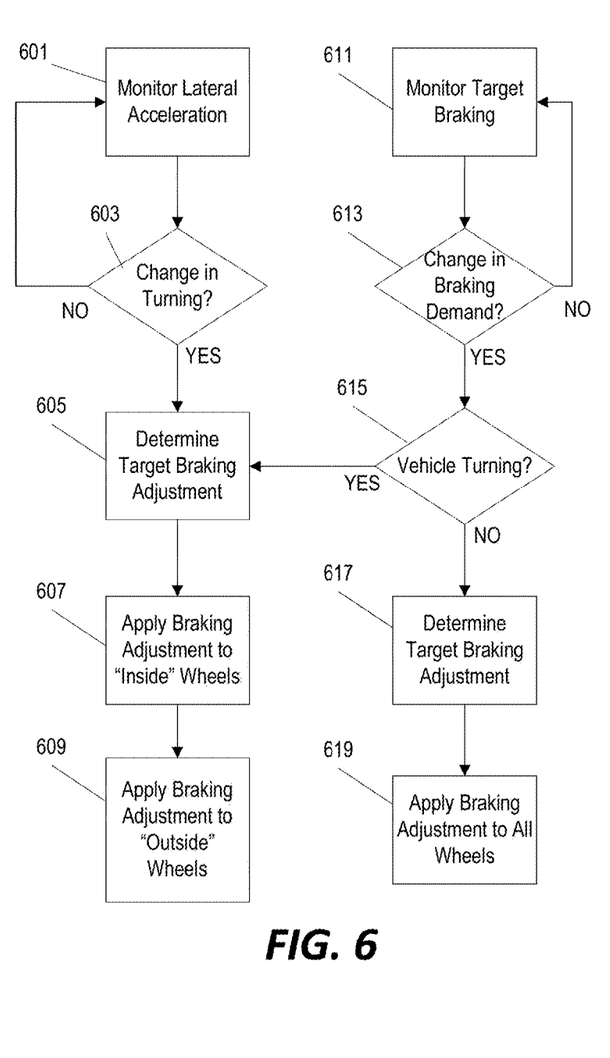
FIG. 6 is a flowchart of a method for applying braking force adjustments to the inside wheel first while applying braking forces while turning according to one embodiment.

Accordingly, in the method of FIG. 6, the braking strategy is adjusted to initially favor the inside wheels in response to detecting a change in vehicle turning. However, the method of FIG. 6 also adjusts the braking strategy to initially favor the inside wheels (e.g., apply a greater braking force to the inside wheels first) in response to detecting a change in braking demand while the vehicle is turning. The controller 101 monitors the target braking (e.g., braking force demand) (step 611) and detects any changes in the braking force demand (step 613). If the vehicle is not turning (step 615), the controller 101 responds to the detected change in the braking force demand by calculating an adjustment to the target braking strategy (step 617) and applies the updated target braking strategy to all wheels of the vehicle (step 619). However, if the controller 101 determines that the vehicle is turning (step 615), then the control determines the target braking adjustment (step 605) and applies the target braking adjustment to the "inside wheels" first (step 607) before applying the braking adjustment to the outside wheels (step 609).

In some implementations, the controller 101 may be configured to apply braking to the inside wheels first under all conditions or, in some implementations, may be configured to only apply the "inside first" braking control strategy under certain detected performance and operating conditions (e.g., when vehicle speed exceeds a threshold). Similarly, in some implementations, the controller 101 may be configured to adjust the rate at which the braking force of the "inside wheels" based on certain performance/operating conditions. For example, the controller 101 may be configured to use a "torque vectoring" strategy wherein a certain percentage of the total braking force for the rear axle wheels is applied by the "inside wheel" and is gradually adjusted to apply a greater percentage of the total braking force on the "outside wheel." Furthermore, in some implementations, the controller 101 is configured to use a "feed-forward" control strategy to reduce the amount of friction energy used to mitigate the understeering condition.

Thus, the invention provides, among other things, a system and method for controlling friction braking and blended regenerative/friction braking to mitigate understeering and oversteering conditions and to cause vehicle performance under blended braking to match performance under friction only braking. Various features and advantages of the invention are set forth in the following claims.

What is claimed is:

1. A method of controlling a vehicle braking system, the method comprising:
applying a braking force to a vehicle by applying a regenerative braking force to wheels of a first axle of the vehicle and applying a friction braking force to wheels of a second axle of the vehicle, wherein applying the braking force to the vehicle includes
determining a target braking force,
identifying a set of inside wheels of the vehicle, wherein the inside wheels include the wheels on a side of the vehicle in a direction of lateral acceleration, and
applying the target braking force to the inside wheels before applying the target braking force to other wheels of the vehicle;
determining, by an electronic processor, a set of actual side-slip angles for the vehicle, the set of actual side-slip angles including a first axle side-slip angle for the wheels of the first axle and a second axle side-slip angle for the wheels of the second axle;
determining, by the electronic processor, a set of estimated side-slip angles for the vehicle, the set of estimated side-slip angles including an estimated first axle side-slip angle for the wheels of the first axle and an estimated second axle side-slip angle for the wheels of the second axle, the set of estimated side-slip angles being indicative of side-slip angles for the vehicle estimated to occur under current driving conditions if the braking force were applied to the vehicle using only friction braking applied to the wheels of the first axle and the wheels of the second axle by a friction braking system of the vehicle;
determining a compensatory yaw moment for the vehicle based on a difference between the set of actual side-slip angles and the set of estimated side-slip angles; and
applying the compensatory yaw moment to the vehicle to cause the set of actual side-slip angles to approach the set of estimated side-slip angles.

2. The method of claim 1, wherein applying the compensatory yaw moment to the vehicle includes applying asymmetric friction braking to the wheels of the vehicle.

3. The method of claim 1, wherein applying the braking force to the vehicle includes applying a blended braking force to the wheels of the first axle by applying the regenerative braking force to the wheels of the first axle and applying a friction braking force to the wheels of the first axle.

4. The method of claim 1, wherein determining the set of actual side-slip angles includes receiving, by the electronic processor, a first signal from a first side-slip angle sensor indicative of the first axle side-slip angle of the wheels of the first axle and a second signal from a second side-slip angle sensor indicative of the second axle side-slip angle of the wheels of the second axle.

5. The method of claim 1, wherein determining the set of estimated side-slip angles includes applying vehicle modeling to determine the set of estimated side-slip angles based on one or more performance variables selected from a group consisting of lateral acceleration, vehicle steering, vehicle speed, and total braking force.

6. The method of claim 1, wherein determining the set of estimated side-slip angles includes determining the set of estimated side-slip angles using a look-up table stored to a non-transitory computer-readable memory.

7. The method of claim 1, wherein determining the compensatory yaw moment for the vehicle includes:

determining an actual yaw moment for the vehicle;
determining an estimated yaw moment for the vehicle based on the set of estimated side-slip angles; and
calculating the compensatory yaw moment as a difference between the actual yaw moment and the estimated yaw moment.

8. A vehicle braking system comprising an electronic controller configured to:
apply a braking force to a vehicle by applying a regenerative braking force to wheels of a first axle of the vehicle and applying a friction braking force to wheels of a second axle of the vehicle, wherein the electronic controller is configured to apply the braking force to the vehicle by
determining a target braking force,
identifying a set of inside wheels of the vehicle, wherein the inside wheels include the wheels on a side of the vehicle in a direction of lateral acceleration, and
applying the target braking force to the inside wheels before applying the target braking force to other wheels of the vehicle;
determine a set of actual side-slip angles for the vehicle, the set of actual side-slip angles including a first axle side-slip angle for the wheels of the first axle and a second axle side-slip angle for the wheels of the second axle;
determine a set of estimated side-slip angles for the vehicle, the set of estimated side-slip angles including an estimated first axle side-slip angle for the wheels of the first axle and an estimate second axle side-slip angle for the wheels of the second axle, the set of estimated side-slip angles being indicative of side-slip angles for the vehicle estimated to occur under current driving conditions if the braking force were applied to the vehicle using only friction braking applied to the wheels of the first axle and the wheels of the second axle by a friction braking system of the vehicle;
determine a compensatory yaw moment for the vehicle based on a difference between the set of actual side-slip angles and the set of estimated side-slip angles; and
apply the compensatory yaw moment to the vehicle to cause the set of actual side-slip angles to approach the set of estimated side-slip angles.

9. The vehicle braking system of claim 8, wherein the electronic controller is configured to apply the compensatory yaw moment to the vehicle by applying asymmetric friction braking to the wheels of the vehicle.

10. The vehicle braking system of claim 8, wherein the electronic controller is configured to apply the braking force to the vehicle by applying a blended braking force to the wheels of the first axle by applying the regenerative braking force to the wheels of the first axle and applying a friction braking force to the wheels of the first axle.

11. The vehicle braking system of claim 8, wherein the electronic controller is configured to determine the set of actual side-slip angles by receiving a first signal from a first side-slip angle sensor indicative of the first axle side-slip angle of the wheels of the first axle and a second signal from a second side-slip angle sensor indicative of the second axle side-slip angle of the wheels of the second axle.

12. The vehicle braking system of claim 8, wherein the electronic controller is configured to determine the set of estimated side-slip angles by applying vehicle modeling to determine the set of estimated side-slip angles based on one or more performance variables selected from a group consisting of lateral acceleration, vehicle steering, vehicle speed, and total braking force.

13. The vehicle braking system of claim 8, wherein the electronic controller is configured to determine the set of estimated side-slip angles by determining the set of estimated side-slip angles using a look-up table stored to a non-transitory computer-readable memory.

14. The vehicle braking system of claim 8, wherein the electronic controller is configured to determine the compensatory yaw moment for the vehicle by:
determining an actual yaw moment for the vehicle;
determining an estimated yaw moment for the vehicle based on the set of estimated side-slip angles; and
calculating the compensatory yaw moment as a difference between the actual yaw moment and the estimated yaw moment.

15. A vehicle braking system comprising:
a hydraulic braking system including a plurality of friction brakes including
a front-right wheel friction brake,
a front-left wheel friction brake,
a rear-right wheel friction brake, and
a rear-left wheel friction brake,
wherein the hydraulic braking system is configured to apply friction braking to wheels of a vehicle by adjusting a hydraulic pressure to each friction brake;
a regenerative braking system including a regenerative braking motor configured to apply a braking force to the wheels of a first axle while generating electrical power; and
a braking system controller configured to
receive a signal indicative of a target total braking force for the vehicle,
operate the hydraulic braking system to apply a first axle friction braking force to the wheels of the first axle and to apply a second axle friction braking force to wheels of a second axle,
operate the regenerative braking system to apply a regenerative braking force to the wheels of the first axle,
identify a set of inside wheels of the vehicle, wherein the inside wheels include the wheels on a side of the vehicle in a direction of lateral acceleration, wherein the electronic controller is configured to apply the total braking force for the vehicle by applying the target braking force to the inside wheels before applying the target braking force to other wheels of the vehicle,
determine a set of actual blended braking side-slip angles for the vehicle,
determine a set of estimated friction only braking side-slip angles for the vehicle based on vehicle modeling, wherein the set of estimated friction only braking side-slip angles for the vehicle is indicative of side-slip angles for the vehicle estimated to occur based on the vehicle modeling under current driving conditions if the total braking force were applied to the vehicle using only the hydraulic braking system,
determine a compensatory yaw moment for the vehicle based on a difference between the set of actual blended braking side-slip angles and the set of estimated friction only braking side-slip angles, and
apply the compensatory yaw moment to the vehicle by adjusting the operation of the hydraulic braking system to apply asymmetric braking force to the wheels of the vehicle.

* * * * *